(12) United States Patent
Kistler

(10) Patent No.: US 10,825,323 B2
(45) Date of Patent: Nov. 3, 2020

(54) SYSTEMS AND METHODS FOR RELAY LOGIC FOR ALARMING AND TRIPPING FOR ENERGIZED DOWNED CONDUCTORS

(71) Applicant: PPL Corporation, Allentown, PA (US)

(72) Inventor: Mychal Kistler, Allentown, PA (US)

(73) Assignee: PPL Corporation, Allentown, PA (US)

( * ) Notice: Subject to any disclaimer, the term of this patent is extended or adjusted under 35 U.S.C. 154(b) by 487 days.

(21) Appl. No.: 15/859,107

(22) Filed: Dec. 29, 2017

(65) Prior Publication Data
US 2019/0206219 A1    Jul. 4, 2019

(51) Int. Cl.
G08B 21/18    (2006.01)
H02H 1/00    (2006.01)
H02H 7/28    (2006.01)

(52) U.S. Cl.
CPC ......... G08B 21/185 (2013.01); *H02H 1/0061* (2013.01); *H02H 1/0092* (2013.01); *H02H 7/28* (2013.01)

(58) Field of Classification Search
CPC ...... H02H 1/0061; H02H 1/0092; H02H 3/04; H02H 3/063; H02H 7/26; H02H 7/28; G08B 21/185

USPC .......................................................... 361/67
See application file for complete search history.

(56) References Cited

U.S. PATENT DOCUMENTS

| | | | | |
|---|---|---|---|---|
| 4,313,146 | A * | 1/1982 | Lee ................. | H02H 3/265 324/107 |
| 5,537,327 | A * | 7/1996 | Snow ............... | G01R 31/50 700/293 |
| 6,453,248 | B1 * | 9/2002 | Hart ................. | G01R 31/088 324/509 |
| 2008/0031520 | A1 * | 2/2008 | Hou ................. | H02H 1/0015 382/168 |
| 2014/0362486 | A1 * | 12/2014 | O'Regan ........... | G01R 1/04 361/87 |

* cited by examiner

Primary Examiner — Kevin J Comber
(74) Attorney, Agent, or Firm — Haynes and Boone, LLP

(57) ABSTRACT

A method of determining a fault and whether to activate an alarm includes detecting a first high impendence fault (HIF) at a first detection circuit having a first phase and triggering a variable pickup timer. The method further includes monitoring for a second HIF at a second detection circuit having a second phase for a period of time set by the variable pickup timer. The method further includes determining whether to trigger an alarm, wherein the alarm is triggered by the second HIF at the second detection circuit having the second phase being detected during the period of time and the alarm is otherwise not triggered.

16 Claims, 3 Drawing Sheets

SYSTEMS AND METHODS FOR RELAY LOGIC FOR ALARMING AND TRIPPING FOR ENERGIZED DOWNED CONDUCTORS

BACKGROUND

Energized downed conductors are a public safety hazard that has plagued electric utilities since the birth of the industry. While various methods have been tried, the solution to detecting and isolating energized downed conductors has proved elusive. The method laid out herein provides protective relay logic to (1) generate a per-phase alarm inside the relay which is then transmitted to the distribution system operator, and (2) secure relay logic to automatically trip and isolate the energized downed conductor(s).

BRIEF SUMMARY

In one embodiment, a method of determining a fault and whether to activate an alarm includes detecting a first high impedance fault (HIF) at a first detection circuit having a first phase and triggering a variable pickup timer. The method further includes monitoring for a second HIF at a second detection circuit having a second phase for a period of time set by the variable pickup timer. The method further includes determining whether to trigger an alarm, wherein the alarm is triggered by the second HIF at the second detection circuit having the second phase being detected during the period of time and the alarm is otherwise not triggered. In one alternative, the method further includes transmitting the alarm to a distribution management system.

In one embodiment, a method of automatically isolating high-impedance faults in an electrical transmission system includes enabling tripping of an automatic isolation system operating on the electrical transmission system. The method further includes detecting a high impedance fault in the electrical transmission system. The method further includes initiating a protective trip and reclose and activating an automatic isolation system. Alternatively, the enabling is executed through a distribution management (DMS) system. In one alternative, the method further includes placing a plurality of protective relays located in the automatic isolation system in high sensitivity mode, prior to initiating the reclose. In one alternative, the protective trip is a trip of a plurality of circuit breakers and reclosers, each of the plurality of circuit breakers and reclosers associated with a distinct one of the plurality of protective relay. In another alternative, the activating of the high impedance fault detection system includes activating a high impedance fault (HIF) alarm. Alternatively, comprising isolating the high impedance fault with the automatic isolation system and reenergizing non-fault areas of the electrical transmission system with the distribution management system. In one alternative, the high impedance fault detection system utilizes a method to determine a location of the high impedance fault, including: detecting a first high impedance fault (HIF) indication at a first protective relay of the plurality of protective relays having a first phase. The method for determining the high impedance fault further includes, triggering a variable pickup timer and monitoring for a second HIF indication at a second protective relay of the plurality of protective relays having a second phase for a period of time set by the variable pickup timer. The method for determining the high impedance fault further includes, determining whether to trigger an alarm, wherein the alarm is triggered by the second HIF at the second detection circuit having the second phase being detected during the period of time and the alarm is otherwise not triggered.

In one embodiment, a system for determining a fault and whether to activate an alarm includes a plurality of detection circuits, each of the plurality of detection circuits associated with a distinct one of a plurality of circuit breakers. The system further includes a variable pickup timer and an alarm. The system is configured to detect a first high impedance fault at a first detection circuit of the plurality of detection circuits having a first phase. The system is further configured to trigger the variable pickup timer. The system is further configured to monitor for a second HIF at a second detection circuit of the plurality of detection circuits having a second phase for a period of time set by the variable pickup timer. The system is further configured to determine whether to trigger the alarm, wherein the alarm is triggered by the second HIF at the second detection circuit having the second phase being detected during the period of time and the alarm is otherwise not triggered. Alternatively, the system is further configured to transmit the alarm to a distribution management system. In another alternative, the plurality of detection circuits are protective relays.

In one embodiment, a system for determining a fault and whether to activate an alarm includes a plurality of detection circuits, each of the plurality of detection circuits associated with a distinct one of a plurality of circuit breakers, the plurality of detection circuits separated into sets of first detection circuits, second detection circuits, and third detection circuits. The system further includes an ANDNOT gate, a first input to the ANDNOT gate connected to the first detection circuits and a second input of the ANDNOT gate connected to the second detection circuits and the third detection circuits, wherein the second input is a NOT input. The system further includes a variable pickup timer, connected to an output of the ANDNOT gate and an alarm, in communication with the variable pickup timer. The system is configured to detect a first high impedance fault (HIF) at the first detection circuit. The system is further configured to trigger the variable pickup timer and monitor for a second HIF at one of the second detection circuits and the third detection circuits for a period of time set by the variable pickup timer. The system is further configured to determine whether to trigger the alarm, wherein the alarm is triggered by the second HIF at one of the second detection circuits and the third detection circuits being detected during the period of time and the alarm is otherwise not triggered. In one alternative, the plurality of detection circuits are protective relays. In another alternative, a latch is located between the variable pickup timer and the alarm.

In one alternative, a system for determining a fault and whether to activate an alarm includes a plurality of detection circuits, each of the plurality of detection circuits associated with a distinct one of a plurality of circuit breakers, the plurality of detection circuits separated into sets of first detection circuits, second detection circuits, and third detection circuits. The system further includes an ANDNOT gate, a first input to the ANDNOT gate connected to the first detection circuits and a second input of the ANDNOT gate connected to the second detection circuits and the third detection circuits, wherein the second input is a not input. The system further includes a variable pickup timer, connected to an output of the ANDNOT gate and an alarm, in communication with the variable pickup timer. The system is configured to detect a first high impedance fault (HIF) at the first detection circuit and trigger the variable pickup timer. The system is further configured to monitor for a second HIF at one of the second detection circuits and the third detection circuits for a period of time set by the variable pickup timer. The system is further configured to determine whether to trigger the alarm, wherein the alarm is triggered by the second HIF at one of the second detection circuits and the third detection circuits being detected during the period of time and the alarm is otherwise not triggered.

In one embodiment, a system for automatically isolating high-impedance faults, in an electrical transmission system includes an enabling switch, configured to enable a turning off and turning on of the automatic isolation system operating on the electrical transmission system. The system further includes a trip initiator. The system further includes a plurality of detection circuits, each of the plurality of detection circuits associated with a distinct one of a plurality of circuit breakers, the plurality of detection circuits separated into sets of first detection circuits, second detection circuits, and third detection circuits. The system further includes an ANDNOT gate, a first input to the ANDNOT gate connected to the first detection circuits and a second input of the ANDNOT gate connected to the second detection circuits and the third detection circuits, wherein the second input is a not input. The system further includes a variable pickup timer, connected to an output of the ANDNOT gate and an alarm, in communication with the variable pickup timer. The system is configured to initiate a protective trip and reclose with the trip initiator. The system is further configured to detect a first high impedance fault (HIF) at the first detection circuit and trigger the variable pickup timer. The system is further configured to monitor for a second HIF at one of the second detection circuits and the third detection circuits for a period of time set by the variable pickup timer. The system is further configured to determine whether to trigger the alarm, wherein the alarm is triggered by the second HIF at one of the second detection circuits and the third detection circuits being detected during the period of time and the alarm is otherwise not triggered. Alternatively, enabling is executed through a distribution management (DMS) system. In one alternative, the system is further configured to place the plurality of protection circuits in the automatic isolation system in high sensitivity mode, prior to initiating the reset. In another alternative, the plurality of detection circuits are protective relays. Alternatively, a latch is located between the variable pickup timer and the alarm.

In one embodiment, a non-transitory digital storage medium having a computer program stored thereon to perform the method for automatically isolating high-impedance faults, in an electrical transmission system includes enabling tripping of an automatic isolation system operating on the electrical transmission system. The method further includes detecting a high impedance fault in the electrical transmission system. The method further includes initiating a protective trip and reclose and activating an automatic isolation system.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details in more detail than may be necessary for a fundamental understanding of the disclosure.

DETAILED DESCRIPTION

Figure 1:
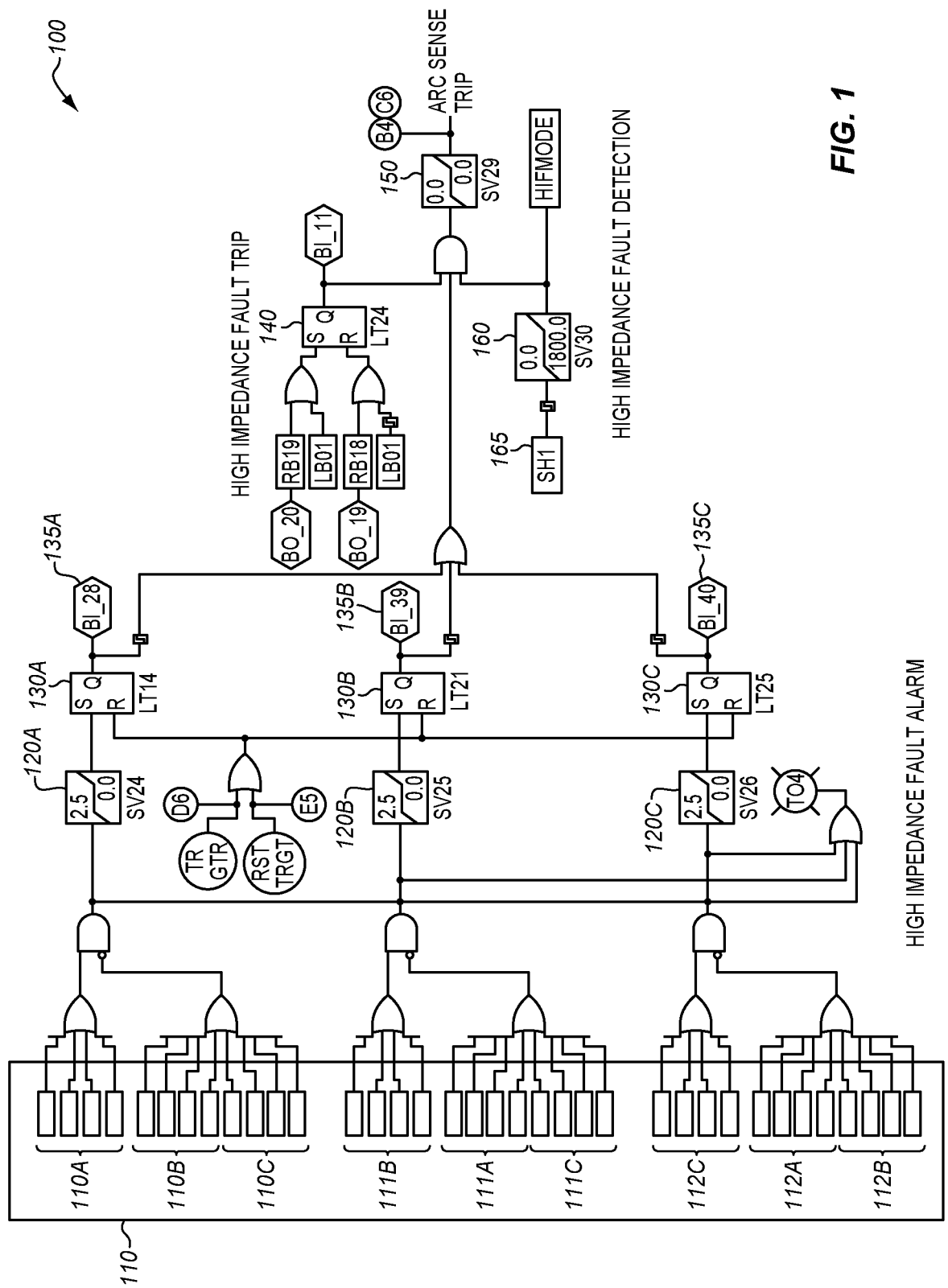
FIG. 1 shows one embodiment of a relay logic elements for isolating faults and tripping alarms related thereto.

Certain terminology is used herein for convenience only and is not to be taken as a limitation on the embodiments of the systems and methods for systems and methods for relay logic for alarming and tripping for energized downed conductors (herein after referred to as Relay Logic, at times). In the drawings, the same reference letters are employed for designating the same elements throughout the several figures.

Many embodiments are designed to operate in power transmission and distribution systems. Typically, these systems include a number of circuit breakers that provide for isolation of parts of the system and protection against dangerous conditions of wires or other broken conductors. High-impedance faults, which are often energized downed conductors, are detected using proprietary algorithms inside protective relays. High-impedance faults are often reflective of downed wires or other shorts or breaks in the power system. These algorithms, operating within protective relays, generate a relay notification that a potential downed conductor has been detected. The relay notification is then utilized in method (1) to generate a high-impedance fault alarm that is latched (locked into transmission or alternatively saved on the system operator's dashboard until acknowledgment) for a set time period or until the system operator manually resets the alarm, providing a window for adequate response time by the system operator, and in method (2) where the notifications are combined with other relay logics and notifications to automatically isolate high-impedance faults.

A first embodiment of a method of tripping and alarm activation, is described herein as method (1). Embodiments of method (1) use a series of successive logical steps to securely execute the tripping algorithm which includes: Enabling a control point that permits the high-impedance tripping algorithm to function, then a protective trip and reclose of the isolating and detecting device using normal fault detection methods, then an initiation of the high-impedance fault alarm. When each of these steps is successively executed the relay will automatically isolate the downstream energized section of line by initiating a high-impedance fault trip to the protective relay trip equation and the protective relay lockout equation.

An embodiment of a tripping and alarm activation including a protective trip and reclose, is described herein as method (2). Embodiments of method (2) encompass method (1). The reason method (1) is broken out into a separate logical path is twofold:

(A) The proprietary high-impedance fault detection methods found in protective relays are not infallible; it was found through testing of these algorithms that they sometimes provide false alarms, and because the utility desires to provide the maximum reliability and continuity of service to the customer false trips could not be allowed. Through testing and real-world protective relay operations it was determined that the successive logic steps provided in method (2) are secure enough to allow for automatic isolation of potential downed conductors.

(B) The proprietary high-impedance fault detection algorithms may sometimes not function at all due to various power system conditions. In these instances the device closest to the high-impedance fault does not provide detection but a device closer to the electrical source does. Utilities build distribution protections schemes such that only the device closest to a permanent fault trips to isolate it; in this scenario a protective relay trip would be provided by the closest device but the high-impedance fault alarm would be provided by a device on the circuit closer to the source, thus the logical steps to isolate the high-impedance fault have been achieved but not in the same protective relay, so automatic isolation cannot be provided. With this information at hand the system operator can still respond to the high-impedance fault alarm using a manual process.

The disclosure describes a logical method for programming protective relays to achieve the described results. It must be reinforced that the high-impedance fault (HIF) detection method consists of proprietary relay algorithms that are informational only and that this disclosure describes a method for utilities to utilize the HIF algorithms in such a way that they can manually or automatically respond to high-impedance faults to reduce the public safety risk associated with energized downed conductor events. Various modifications and alternatives will be available, depending on the equipment deployed within the power transmission system.

In this disclosure "energized downed conductor" and "high-impedance fault" are used interchangeably but they are not necessarily the same; all energized downed conductors are high-impedance faults but not all high-impedance faults are energized downed conductors. It is not always true that a fault is an energized down conductor, since an energized downed conductor requires contact with the ground to produce a HIF. Different scenarios may occur with a covered wire. The goal of the proprietary algorithms, and also the method described in this disclosure, is to securely detect and isolate energized downed conductors since they present the largest public safety hazard.

A "protective relay" is a type of relay specifically designed to detect power system faults and is commonly used by utilities to protect all equipment. Protective relays are also used to control circuit breakers and reclosers and to provide alarm, status and analog points to other utility systems, but in this disclosure specifically to the distribution management system (DMS) that is utilized by the distribution system operators to monitor and control distribution facilities.

Protective relays come equipped with only the most basic of protection and control functions and as a result may be programmed to provide the desired outcome. In this disclosure "relay logic" is the programmable methods implemented inside the protective relays to achieve the desired functions. More detailed descriptions in this disclosure reference FIG. 1 and the specific relay logic elements found therein, but it is noted that the specific logical elements used are sometimes not relevant to the operation of this method, rather it is correct combination of inputs and outputs to the logic described herein that produces the desired result. To clarify by way of an example, it does not matter that LT24 may be replaced with LT19, so long as the inputs and outputs remain the same.

Method (1) uses the relay proprietary HIF detection method described herein to provide an alarm to the DMS which the system operator can then respond to. This method may be referred to as an automatic isolation method and the components implementing it an automatic isolation system.

As stated previously, the HIF detection algorithms are not infallible and can sometimes produce false alarms. A false alarm can be described as an event where the alarm is triggered and there is no high-impedance fault. Further, due to various system conditions conflicting with the fundamentals of the algorithm the HIF detection may not function at all in the device electrically closest to the high-impedance fault. As a result of these factors automatic isolation cannot securely be provided in all cases using just method (1) because the utility desires to maximize continuity of service to the customer, and so another means must be found to isolate the public safety hazard downed conductors present.

Embodiments of method (1) are designed to work as follows: The HIF detection algorithms provide detection on a per-phase basis. Each group of per-phase alarms (A, B, C) is grouped into a single-phase alarm point (A, B, C) and passes through a filter to assist in filtering out false alarms. Once passed through the filter the alarm is latched for a set time period, or can be manually reset by the system operator.

The filter establishes a time widow in which a different phase HIF detection cannot be asserted; if another a phase HIF detection asserts the initial alarm is cancelled. For an example, reference FIG. 1. If any Phase A HIF detection circuit 110a, 111a, 112a asserts, for example HIF1_A, the variable pickup timer 120a is SV24 triggered. (Note that Phase A HIF detection circuit 110a and Phase A HIF detection circuit 111b are the same circuits, merely offering input at different points in the system. The same holds true for the other Phase circuits, A, B, and C. If any other HIF detection asserts within the time window programmed the initial Phase A alarm is cancelled. Testing and real world experience shows that nearly all downed conductors result in only a single phase alarming and thus it was deemed acceptable to block the alarm for any event that results in multiple phases of the HIF detection algorithms asserting. The time is adjustable and was chosen by analyzing the timing of false alarms. Various time settings are possible.

FIG. 1 shows one embodiment of a logical circuit for relay for alarming and tripping, showing logical operators. In a first logical operation, if a fault is tripped by one of the HIF detection circuits 110, then operations commence to determine whether a false fault has occurred, or an actual fault. In this procedure, the A phase HIF detection circuits 110a, 111a, 112a, the B phase HIF detection circuits 110ba, 111b, 112b, the C phase HIF detection circuits 110c, 111c, 112c are arranged in three logical groups, each group of A, B, C phase HIF detection circuits feeding in logical groups to OR logical circuits 115a, 115b and then on to ANDNOT logical circuits 116a, 116b, 116c. The A phase HIF detection circuits 110a include generally four individual HIF detection circuits, HIA1_A, HIA2_A, HIF1_A, and HIF2_A. Similarly, the A phase HIF detection circuits 110b include generally four individual HIF detection circuits, HIA1_B, HIA2_B, HIF1_B, and HIF2_B. Similarly, the C phase HIF detection circuits 110c include generally four individual HIF detection circuits, HIA1_C, HIA2_C, HIF1_C, and HIF2_C. In operation, if a fault is detected in an A phase HIF detection circuit, then it may be determined whether it is a false alarm, or whether it is an actual HIF. In the top group of HIF detection circuits 110, if an HIF is triggered by any A phase HIF detection circuits 110a and fed to OR logical circuit 115a and no HIF is triggered in B phase HIF detection circuits 110b or C phase HIF detection circuits 110c and fed to OR logical circuit 115b, then ANDNOT logical circuit 116a receives a 1 (or on) signal from OR logical circuit 115a and a 0 (or off) signal from OR logical circuit 115b. The ANDNOT logical circuit 116a requires that a first condition be true (or 1 or on) and a second condition be false (or 0 or off) in order to pass a true (or 1 or on) forward. This is the case in the above scenario and is indicative of a HIF that is not a false alarm, since the HIF results from only a single phase (phase A). In contrast, if any of the in B phase HIF detection circuits 110*b* or C phase HIF detection circuits 110*c* are activated, then the ANDNOT logical circuit 116*a* receives two true signals, and the ANDNOT is not fulfilled. In this way the other logical circuits function for B phase detection (ANDNOT logical circuit 116*b*) and C phase detection (ANDNOT logical circuit 116*c*).

Once the HIF detection has passed through the filter it sets a latch 130*a* (LT14 for this example) which locks in a binary alarm point 135*a* (BI_28) that is continually sent to the DMS system (or sent once and kept active or on display on a dashboard), and the system operator display, until an adjustable timer expires or the alarm is manually reset. Latches 130*b*, 130*c* similarly receive signals from variable pickup timers 120*b*, 120*c* respectively and activate binary alarm points 135*b*, 135*c* respectively, according to scenarios where fault is with This latching of the HIF alarm ensures that the alarm will be displayed long enough for the system operator to acknowledge the alarm and develop an adequate response; in not latching the alarm it is possible that the alarm could be missed as it rotates out of the display and an energized downed conductor that was detected and could have been isolated would not have been responded to.

Figure 2:
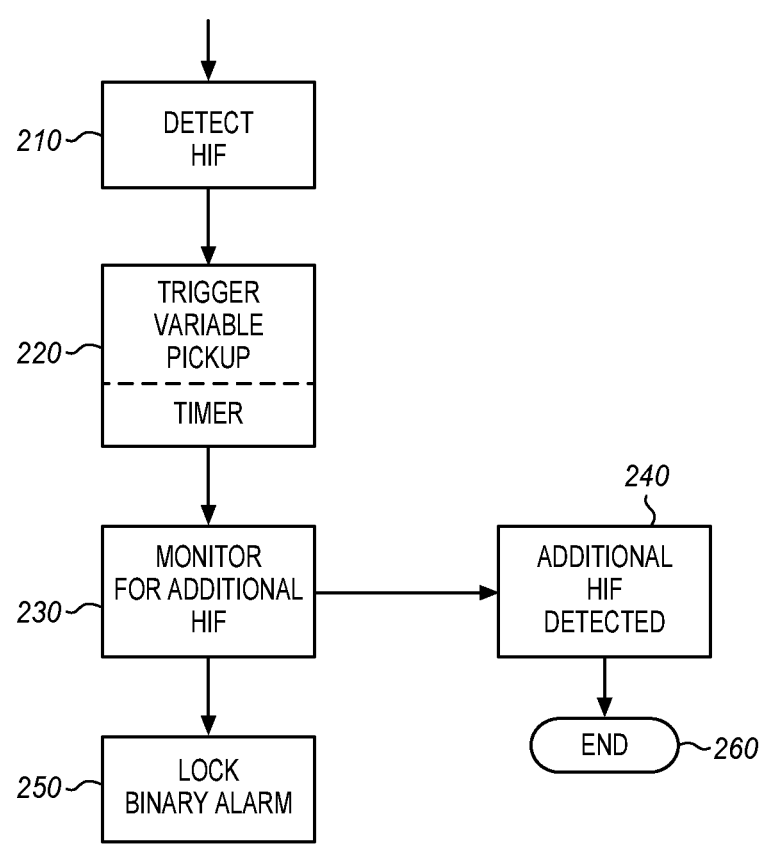
FIG. 2 shows one embodiment of a flow chart for a method of determining a High Impedance Fault (HIF) and triggering alarms.

FIG. 2 shows one embodiment of a flow chart for method 1. At step 210, a HIF is detected. This triggers a variable pickup timer in step 220. In step 230, the system monitors for an additional HIF. In step 240, if the additional HIF has a different phase than the initial HIF detected, then the flow proceeds to an end state in step 250, since it has been determined that it is likely that the fault was a false alarm. If no HIF of a different phase is detected within the timer period, then the flow proceeds to step 250 where the binary alarm is locked.

The embodiment of method (2) described, provides a secure method for automatically isolating high-impedance faults by using a successive series of logical steps. This method was developed by detailed review of real downed conductor events by looking at operational, logical and oscillographic data. Method (2) provides for the following logic steps to happen in the order described: First, the tripping should be enabled; second, the relay initiates a normal protective trip and reclose; and third, a HIF alarm is initiated. For an example reference FIG. 1.

In FIG. 1 Latch 24 (LT24) 140 is used to enable or disable the tripping functionality. This may be generically referred to as an enabling switch herein. Typically, LT24 140 is in the "set" status to allowing automatic isolation to happen. The set status is controlled by the system operator through the DMS system or by a virtual push button on the front of the relay. This allows tripping to be enabled or disabled remotely, providing a convenient method quickly and easily enable or disable automatic isolation at the discretion of the system operator. Tripping may be disabled, for example, when a temporary major line reconfiguration happens because the HIF detection algorithm may not correctly function until it adapts to the new line configuration. Tripping could then easily be restored remotely when the line is returned to normal status. The tripping enable latch, LT24 140 in this example, also energizes a binary input (BI_28) that sends a notification to the system operator so the DMS display will provide feedback on whether the relay has acknowledged the enable/disable command. Finally, the tripping latch supervises the entire HIF alarm trip logic, SV29 150 in this example, and should be in the set status to allow the other logic programmed into SV29 150 to execute.

With the HIF tripping function enabled the next logic step is for the relay (also called a trip initiator) to initiate a trip using normal protection methods and then initiate a reclose. Reclosing is only allowed after a normal protective trip; therefore the rising edge trigger of SH1 relay logic is used to initiate this part of the HIF tripping logic. The rising edge trigger assures that the assertion of SH1 is the first step in the logical process to initiating tripping. SH1 then triggers the HIF algorithm to go into "high sensitivity mode" (HSM). HSM is not normally utilized because the increased sensitivity can lead to false alarms, however there is a much higher likelihood of an energized downed conductor occurring in the time after a protective relay trip because there was a system disturbance that caused the trip so it was deemed worth the risk to activate HSM for a variable time after the initial trip and reclose. This assertion of SH1 165 will lock in the next stage of the logic execution, in this example SV30 160, for the variable time period set, which in this example is 60 minutes (1800 seconds).

With the SV30 160 logic locked in the HIF detection algorithm then assert as described in method (1), which passes through the filter to the latch and completes the final stage of initiating tripping to automatically isolate the downed conductor by activating SV30 160, which is then passed to the relays normal tripping equation to open the circuit breaker or recloser to de-energize the line, and also passed to the lockout equation to prevent the recloser logic from automatically restoring the line and re-energizing the downed conductor.

Figure 3:
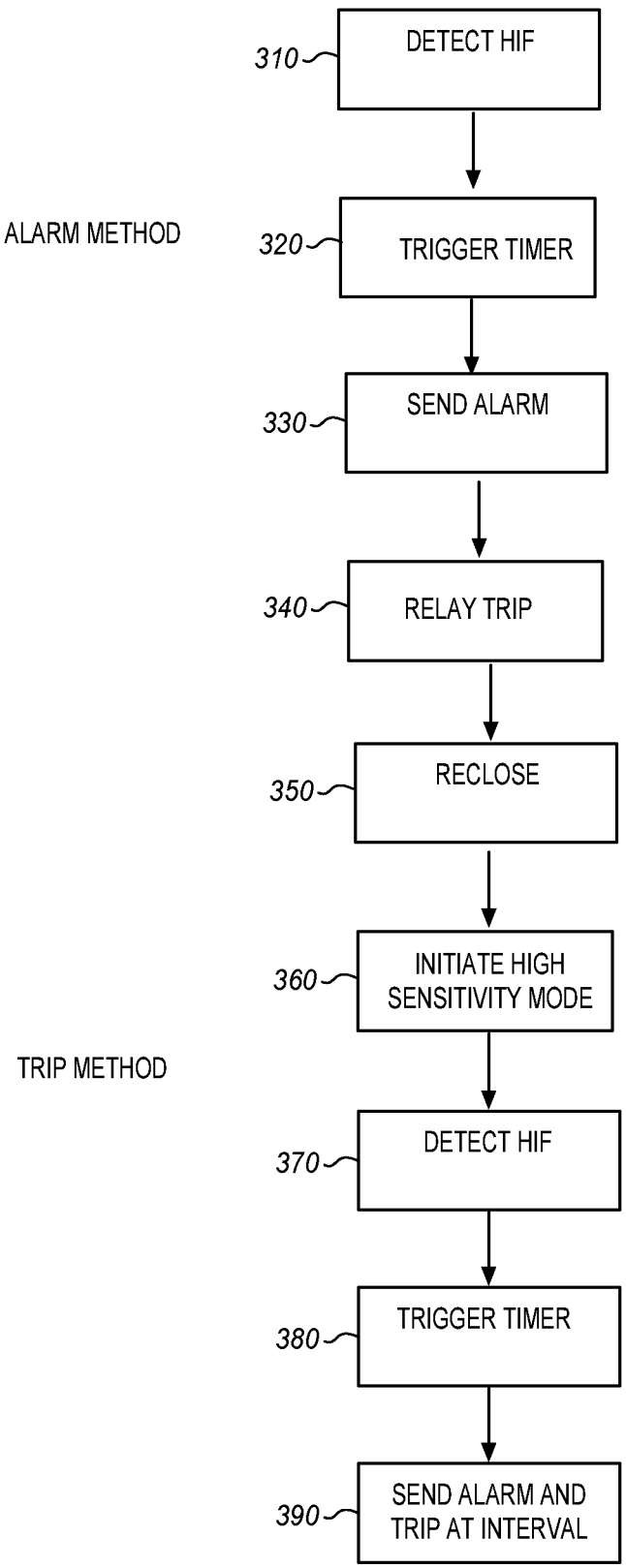
FIG. 3 shows one embodiment of a method to automatically trip and isolate HIF.

FIG. 3 describes one embodiment of method (2). Essentially, the method is divided into two sub-methods, the Alarm Method including steps 310, 320, 330 and the Trip Method includes steps 340-390. The Alarm Method, generally encompasses Method 1, described above in respect to FIG. 2. In step 310 it is determined whether a HIF has occurred. This happens according to the method of detecting a HIF and monitoring to determine if a fault of a different phase occurs and not tripping the alarm if a different phase occurs during the triggered timer in step 320. If no other phase HIF occurs then the alarm is triggered in step 330. This causes a protective trip in step 340. Then in step 350 the circuits are reclosed. The system is then switched to high sensitivity mode in step 360. In step 370, method (1) of FIG. 2 is essentially initiated to find and isolate the fault. In step 370, a HIF is detected. In step 380, the timer is triggered to wait for a fault in a different phase and if this is not detected then the alarm is activated in step 390 and at a preset interval, the trip will be repeated.

This specific succession of logical steps was chosen because real world experiences showed that it will operate correctly for high-impedance faults that are energized downed conductors. The operational theory is that the initial disturbance, perhaps a falling tree or vehicle hitting a utility pole, causes a phase wire to break. The phase wire then contacts the neutral wire as it falls to the ground, causing the nearest protective relay to detect this contact and trip using normal fault detection methods. The relay then initiates a reclose not knowing there is potentially an energized downed conductor on the ground. By the time reclosing has occurred the wire has contacted the ground and created an electrically high-impedance path for current to flow, disallowing the relay from detecting this fault using normal methods. At this point in time the high-sensitivity mode has been activated to assist in detection speed of this energized downed conductor. If the HIF detection algorithm triggers in the window where HSM is live, the energized downed conductor has been successfully detected and the methods described herein will execute the relay logic to trip and isolate the line section, eliminating the public safety hazard of the energized wire on the ground.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A method of determining a fault and whether to activate an alarm, the method comprising:
    detecting a first high impedance fault (HIF) at a first detection circuit having a first phase;
    triggering a variable pickup timer;
    monitoring for a second HIF at a second detection circuit having a second phase for a period of time set by the variable pickup timer;
    determining whether to trigger an alarm, wherein the alarm is triggered by the second HIF at the second detection circuit having the second phase being detected during the period of time and the alarm is otherwise not triggered.

2. The method of claim 1 further comprising:
    transmitting the alarm to a distribution management system.

3. A method of automatically isolating high-impedance faults, in an electrical transmission system, the method comprising:
    enabling tripping of an automatic isolation system operating on the electrical transmission system, wherein the enabling is executed through a distribution management (DMS) system;
    detecting a high impedance fault in the electrical transmission system;
    initiating a protective trip and reclose, wherein the protective trip is a trip of a plurality of circuit breakers and reclosers, each of the plurality of circuit breakers and reclosers associated with a distinct one of the plurality of protective relay;
    activating an automatic isolation system, wherein the activating of the high impedance fault detection system includes activating a high impedance fault (HIF) alarm;
    placing a plurality of protective relays located in the automatic isolation system in a higher sensitivity mode, prior to initiating the reclose;
    isolating the high impedance fault with the automatic isolation system and reenergizing non-fault areas of the electrical transmission system with the distribution management system; wherein the high impedance fault detection system utilizes a method to determine a location of the high impedance fault, including:
    detecting a first high impedance fault (HIF) indication at a first protective relay of the plurality of protective relays having a first phase;
    triggering a variable pickup timer;
    monitoring for a second HIF indication at a second protective relay of the plurality of protective relays having a second phase for a period of time set by the variable pickup timer;
    determining whether to trigger an alarm, wherein the alarm is triggered by the second HIF at the second detection circuit having the second phase being detected during the period of time and the alarm is otherwise not triggered.

4. A system for determining a fault and whether to activate an alarm, the system comprising:
    a plurality of detection circuits, each of the plurality of detection circuits associated with a distinct one of a plurality of circuit breakers;
    a variable pickup timer;
    an alarm; wherein the system is configured to detect a first high impedance fault (HIF) at a first detection circuit of the plurality of detection circuits having a first phase;
    trigger the variable pickup timer;
    monitor for a second HIF at a second detection circuit of the plurality of detection circuits having a second phase for a period of time set by the variable pickup timer;
    determine whether to trigger the alarm, wherein the alarm is triggered by the second HIF at the second detection circuit having the second phase being detected during the period of time and the alarm is otherwise not triggered.

5. The system of claim 4, wherein the system is further configured to transmit the alarm to a distribution management system.

6. The system of claim 5, wherein the plurality of detection circuits are protective relays.

7. A system for determining a fault and whether to activate an alarm, the system comprising:
    a plurality of detection circuits, each of the plurality of detection circuits associated with a distinct one of a plurality of circuit breakers, the plurality of detection circuits separated into sets of first detection circuits, second detection circuits, and third detection circuits;

an ANDNOT gate, a first input to the ANDNOT gate connected to the first detection circuits and a second input of the ANDNOT gate connected to the second detection circuits and the third detection circuits, wherein the second input is a not input;

a variable pickup timer, connected to an output of the ANDNOT gate;

an alarm, in communication with the variable pickup timer; wherein the system is configured to detect a first high impedance fault (HIF) at the first detection circuit;

trigger the variable pickup timer;

monitor for a second HIF at one of the second detection circuits and the third detection circuits for a period of time set by the variable pickup timer;

determine whether to trigger the alarm, wherein the alarm is triggered by the second HIF at one of the second detection circuits and the third detection circuits being detected during the period of time and the alarm is otherwise not triggered.

8. The system of claim 7, wherein the plurality of detection circuits are protective relays.

9. The system of claim 8, wherein a latch is located between the variable pickup timer and the alarm.

10. A system for determining a fault and whether to activate an alarm, the system comprising:

a plurality of detection circuits, each of the plurality of detection circuits associated with a distinct one of a plurality of circuit breakers, the plurality of detection circuits separated into sets of first detection circuits, second detection circuits, and third detection circuits;

an ANDNOT gate, a first input to the ANDNOT gate connected to the first detection circuits and a second input of the ANDNOT gate connected to the second detection circuits and the third detection circuits, wherein the second input is a not input;

a variable pickup timer, connected to an output of the ANDNOT gate;

an alarm, in communication with the variable pickup timer; wherein the system is configured to detect a first high impedance fault (HIF) at the first detection circuit;

trigger the variable pickup timer;

monitor for a second HIF at one of the second detection circuits and the third detection circuits for a period of time set by the variable pickup timer;

determine whether to trigger the alarm, wherein the alarm is triggered by the second HIF at one of the second detection circuits and the third detection circuits being detected during the period of time and the alarm is otherwise not triggered.

11. A system for automatically isolating high-impedance faults, in an electrical transmission system, the system comprising:

an enabling switch, configured to enable a turning off and turning on of the automatic isolation system operating on the electrical transmission system;

a trip initiator;

a plurality of detection circuits, each of the plurality of detection circuits associated with a distinct one of a plurality of circuit breakers, the plurality of detection circuits separated into sets of first detection circuits, second detection circuits, and third detection circuits, an ANDNOT gate, a first input to the ANDNOT gate connected to the first detection circuits and a second input of the ANDNOT gate connected to the second detection circuits and the third detection circuits, wherein the second input is a not input;

a variable pickup timer, connected to an output of the ANDNOT gate;

an alarm, in communication with the variable pickup timer; wherein the system is configured to initiate a protective trip and reclose with the trip initiator;

detect a first high impedance fault (HIF) at the first detection circuit;

trigger the variable pickup timer;

monitor for a second HIF at one of the second detection circuits and the third detection circuits for a period of time set by the variable pickup timer;

determine whether to trigger the alarm, wherein the alarm is triggered by the second HIF at one of the second detection circuits and the third detection circuits being detected during the period of time and the alarm is otherwise not triggered.

12. The system of claim 11, wherein the enabling is executed through a distribution management (DMS) system.

13. The system of claim 12, wherein the system is further configured to place the plurality of protection circuits in the automatic isolation system in high sensitivity mode, prior to initiating the reset.

14. The system of claim 13, wherein the plurality of detection circuits are protective relays.

15. The system of claim 14, wherein a latch is located between the variable pickup timer and the alarm.

16. A non-transitory digital storage medium having a computer program stored thereon to perform the method for automatically isolating high-impedance faults, in an electrical transmission system, the method comprising:

enabling tripping of an automatic isolation system operating on the electrical transmission system, wherein the enabling is executed through a distribution management (DMS) system;

detecting a high impedance fault in the electrical transmission system;

initiating a protective trip and reclose, wherein the protective trip is a trip of a plurality of circuit breakers and reclosers, each of the plurality of circuit breakers and reclosers associated with a distinct one of the plurality of protective relay;

activating an automatic isolation system, wherein the activating of the high impedance fault detection system includes activating a high impedance fault (HIF) alarm;

placing a plurality of protective relays located in the automatic isolation system in a higher sensitivity mode, prior to initiating the reclose;

isolating the high impedance fault with the automatic isolation system and reenergizing non-fault areas of the electrical transmission system with the distribution management system; wherein the high impedance fault detection system utilizes a method to determine a location of the high impedance fault, including:

detecting a first high impedance fault (HIF) indication at a first protective relay of the plurality of protective relays having a first phase;

triggering a variable pickup timer;

monitoring for a second HIF indication at a second protective relay of the plurality of protective relays having a second phase for a period of time set by the variable pickup timer;

determining whether to trigger an alarm, wherein the alarm is triggered by the second HIF at the second detection circuit having the second phase being detected during the period of time and the alarm is otherwise not triggered.

* * * * *